(12) United States Patent
Sanelli

(10) Patent No.: US 6,560,877 B2
(45) Date of Patent: May 13, 2003

(54) TOOL FOR PREPARING AND TREATING FOOD AND METHOD FOR PERSONALIZING SAID TOOL

(75) Inventor: Gian Battista Sanelli, Premana (IT)

(73) Assignee: Fiskars Montana S.r.l., Prenama (IT)

( * ) Notice: Subject to any disclaimer, the term of this patent is extended or adjusted under 35 U.S.C. 154(b) by 0 days.

(21) Appl. No.: 09/775,622

(22) Filed: Feb. 5, 2001

(65) Prior Publication Data

US 2001/0042309 A1 Nov. 22, 2001

(30) Foreign Application Priority Data

Feb. 3, 2000 (IT) .......................... MI00A0170

(51) Int. Cl.⁷ ................................ B26B 3/00
(52) U.S. Cl. .......................... 30/340; 30/147
(58) Field of Search .................. 30/340, 142; D7/393, D7/649, 653, 664

(56) References Cited

U.S. PATENT DOCUMENTS 2,875,515 A * 3/1959 Sieminsky .................. 30/340
5,008,970 A * 4/1991 Tsai ............................ 30/340

FOREIGN PATENT DOCUMENTS

| DE | 949079 | 9/1956 |
| DE | 3315768 | 10/1984 |
| EP | 0 829 842 A1 | 3/1998 |
| GB | 2 179 240 | 3/1987 |
| GB | 2 267 052 | 11/1993 |

* cited by examiner

Primary Examiner—Douglas D. Watts
(74) Attorney, Agent, or Firm—Sughrue Mion, PLLC

(57) ABSTRACT

A tool for preparing and treating food, such as knife, large fork, ladle, chopping board, etc., personalizable depending on the expected specific use, comprises a portion intended to come into contact with the food and a handle portion intended to allow the gripping of the tool by a user. The handle portion comprises at least one housing intended to house a distinguishing insert. The tool of the invention can thus be personalized by the user depending on the type of foodstuff for which it must be used.

14 Claims, 10 Drawing Sheets

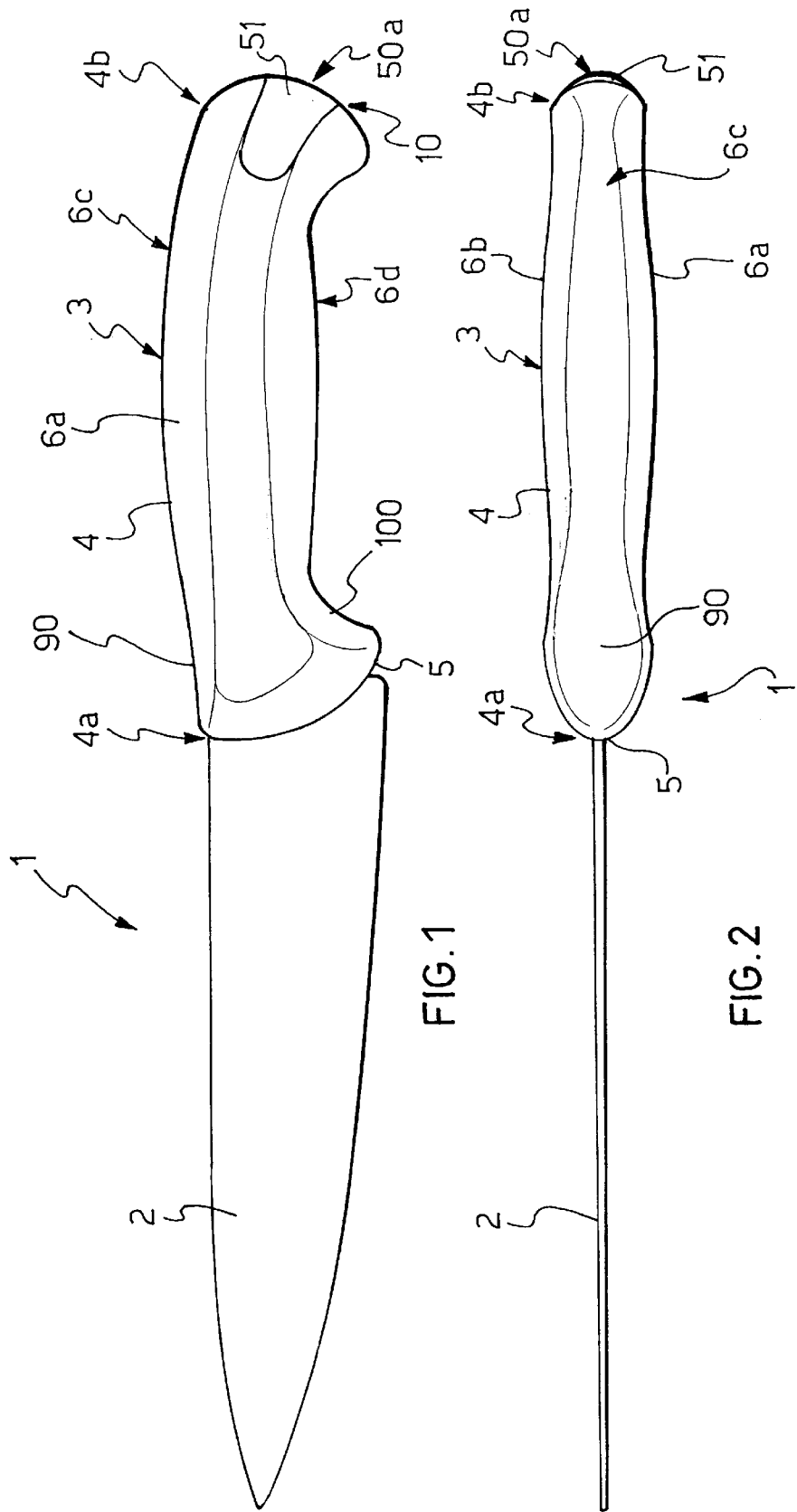

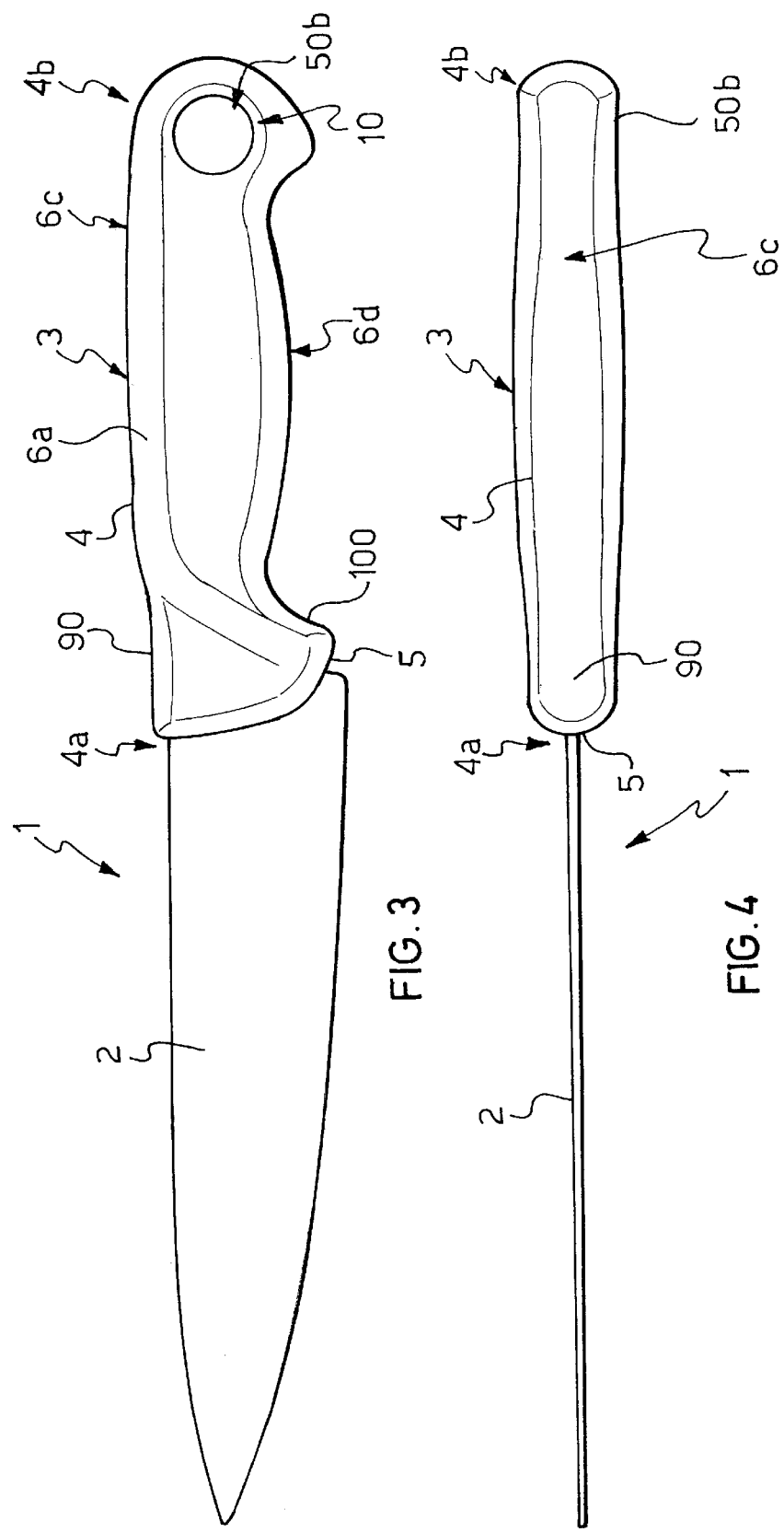

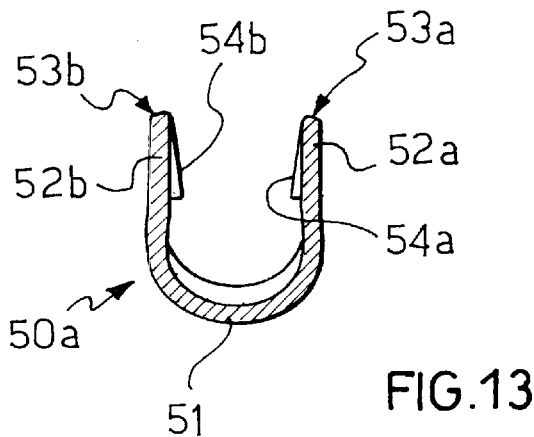
FIG.13
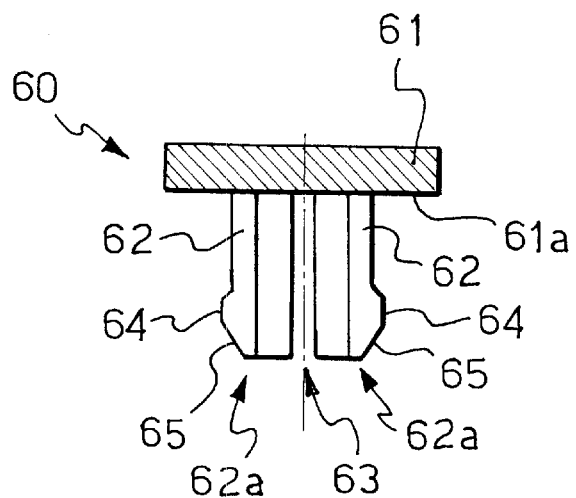
FIG.14
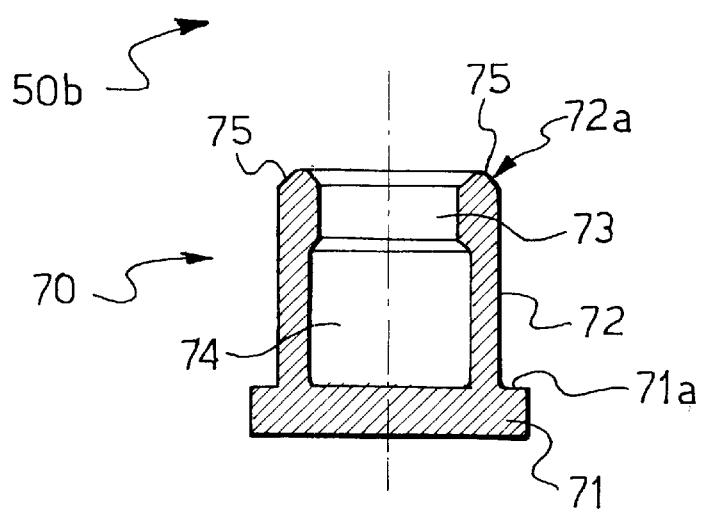

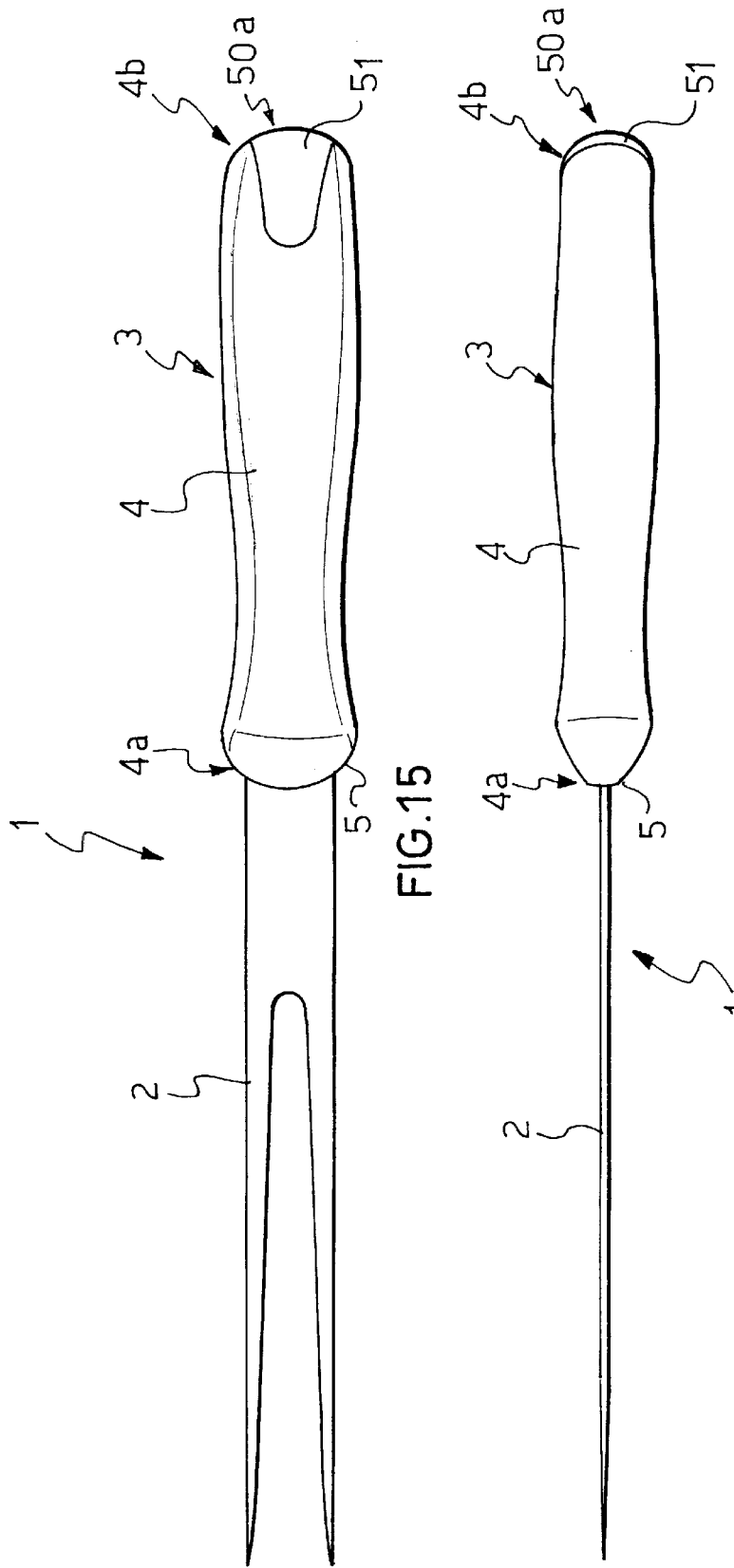

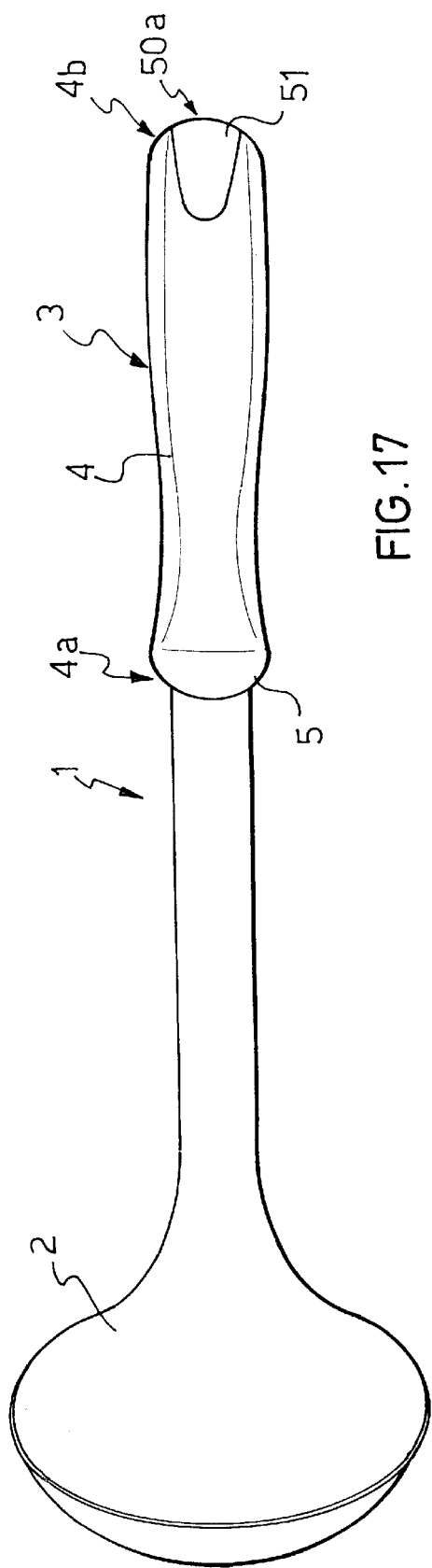
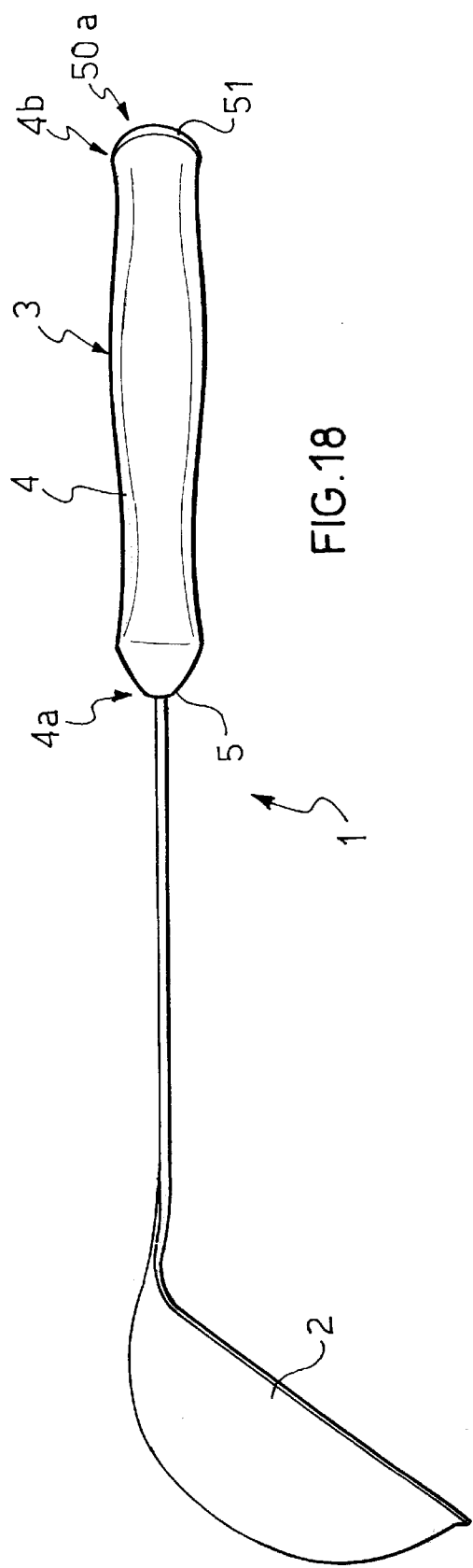
FIG. 17
FIG. 18

TOOL FOR PREPARING AND TREATING FOOD AND METHOD FOR PERSONALIZING SAID TOOL

BACKGROUND OF THE INVENTIONS

The present invention relates to a tool for preparing and treating food, comprising a portion intended to come into contact with food and a handle portion intended to allow the gripping of the tool by a user. The invention also relates to a method for personalizing said tool depending on the type of foodstuff for which it is provided. Moreover, the invention relates to a distinguishing insert for personalizing a tool of the type indicated above and to a handle for said tool. Finally, the invention further relates to a kit of parts for a combined use in the manufacture of a tool of the type described above and to a method for manufacturing said kit of parts.

In this description and following claims, the expression: "tool for preparing and treating food", is used to indicate any kitchen tool intended to come into contact with food either during the preparation of food and thereafter. In particular, reference is preferably, but not exclusively, made to tools typically used in industrial or community professional kitchens (public kitchens, staff restaurants, public restaurants, etc.); said tools are, for example, knives, large forks, chopping boards, ladles, scissors, strainers or colander, etc. For exemplifying purposes and for simplicity of discussion, in the following description reference shall often be made to knives, and more in particular, to kitchen knives, it being understood that what said can be similarly applied also to the other types of tools mentioned above.

The expression: "kitchen knife", is used to indicate, in particular, a knife intended to be used in community or industrial professional kitchens for preparing and/or treating foodstuff; the expression: "table knife", is used to indicate, in particular, a knife adapted to be used by the users as cutlery when eating.

As known, in most European and non-European countries a directive issued by the various hygiene boards and/or ministries of health is in force; said directive obliges the operators of the field of collective catering (public kitchens, staff restaurants, public restaurants, etc.) to sort out the various tools according to the specific type of foodstuff for which they are provided; according to said directive, thus, a predetermined tool must be used only and exclusively for a predetermined typology of foodstuff (meat, fish, vegetables, milk products, etc.).

A first method for complying with the obligations of said directive is to keep the tools intended to be used for a predetermined type of foodstuff physically separate from those intended to be used for a different type of foodstuff, thereby preventing them from being mixed up with one another. It is quite evident that this is difficult to be accomplished into restaurants and kitchens of large size, where there is often a wide and differentiated use of various tools by several operators at the same time.

A second method, which is certainly more functional, for complying with the obligations of the directive mentioned above is that of marking the tools so as to allow the operator to visually distinguish the various tools according to the type of foodstuff for which they must be used; in this way, it is possible to associate a predetermined typology of food with a predetermined type of mark so as to use, for said typology of food, only the tools having said predetermined mark. For example, it is possible to mark the tools according to a colour code selected by the operator, each colour being associated to a predetermined typology of food; all tools marked with the same colour can thus be used only for that predetermined typology of food, and they are easily recognisable from the other tools, which are marked with different colours.

In the field of knives, and above all in that of kitchen knives, tools provided with marks of the type indicated above are known. In particular, they are knives comprising a handle provided with an inside core, integrally formed with the blade, having a first colour, and with an outside coating having a second colour different from the first one; the coating is manufactured so as to only partly cover the core, thus letting it appear from a part of the handle. In said types of knives, the distinguishing mark is thus provided into the knife handle during the manufacturing step of the same and consists of the colour of the core appearing from the handle. Said colour allows the operator to distinguish that knife from the others having a different core colour, so as to use, afterwards, for a predetermined type of food, only knives having a core of a predetermined colour.

Although substantially satisfying the purpose of being easily distinguishable from one another, the knives of the type described above exhibit some drawbacks.

A first drawback relates to the need, for the manufacturer, of providing a differentiated production of a plurality of series of knives, each series having a predetermined pair of core/coating colours, so as to allow the user to use the knives of a first series for cutting a predetermined typology of food and the knives of a different series for cutting a different typology of food; this clearly implies relatively high manufacturing costs and times, which unavoidably reflect on the sales price of the knives.

A second drawback relates to the impossibility, for the operator or user, of varying at his choice the pair of core/coating colours; this implies the need of deciding, at the moment of the purchase order, the typologies of food for which said knives will be used and consequently, the number of series of knives and the number of knives to buy for each series.

SUMMARY OF THE INVENTION

The technical problem at the basis of the present invention is that of providing a system for manufacturing and using kitchen tools which is more elastic and flexible than that described above with reference to the knives of the prior art, so as to overcome the drawbacks indicated above.

In a first aspect thereof, thus, the invention relates to a tool for preparing and treating food, comprising a portion intended to come into contact with the food and a handle portion intended to allow the gripping of the tool by a user, characterised in that said handle portion comprises at least one housing intended to house a distinguishing insert.

Unlike the tools indicated above with reference to the prior art, wherein the presence of a distinguishing mark on the handle is provided since the tool manufacturing step, the tools of the present invention are provided with a neutral handle portion, that is, without any distinguishing mark. The personalization of the tools according to the typology of food for which they are intended to be used is not carried out by the tool manufacturer anymore; rather, it is carried out directly by the user by inserting the distinguishing insert into the housing formed into the tool handle portion. This allows providing a system for manufacturing and using the tools which is more elastic and flexible than that associated to the tools described above with reference to the prior art, thus allowing to achieve a series of advantages, both for the tool manufacturer and for the user, which shall be described in detail in the following description.

A first advantage is associated to the fact that, according to the invention, for a predetermined typology of tool (for example knives, large forks, chopping boards, ladles, scissors, strainers or colander) the manufacturer can manufacture a single series of neutral tools, that is, without distinguishing marks, thereby without taking care to differentiate the production in function of the different foodstuff for which the tools are provided; advantageously, the tools can be all equal to each other and thus, they can be obtained from a single die, or from similar dies. That is to say, it is possible to provide for a grand scale production of tools, thus obtaining a considerable reduction of manufacturing costs and times with respect to what was possible with the knives manufacturing systems of the prior art.

A second advantage is associated to the fact that, for a predetermined typology of tool, the user can buy a single series of neutral tools and, afterwards, personalize them depending on the specific use he intends to make of them. Thus, it is not necessary anymore for the user to decide, at the moment of the purchase order, the typology of food for which said tools shall be used, and consequently, the number of tools to be used for each typology of food; in fact, the user can buy a predetermined number of tools and personalize them at his choice in any moment depending on the specific use he wants to make of them.

Preferably, said at least one housing or said distinguishing insert comprises means adapted to allow the housing of said distinguishing insert into said at least one housing in a substantially non-removable way; in this way, the personalization carried out by the user is irreversible, thus preventing possible mixing up of tools intended for preparing and treating different typologies of food. Said means adapted to allow the housing of the insert into the respective housing in a substantially non-removable way shall be described in detail in the following description.

The housing for the distinguishing insert can have different shape and/or size, according to the specific typology of tool of interest.

According to a first embodiment of the tool of the present invention, said at least one housing comprises a substantially U-shaped groove which extends at least partly on opposed side surfaces of said handle portion. Even more preferably, said groove comprises opposed recesses formed onto said opposed side surfaces of said handle portion and intended to cooperate with respective projections integrally formed with said distinguishing insert, so as to allow a snap-wise housing of said insert into said groove. A housing of the type described above is preferably formed on the handle of knives, large forks, ladles, strainers or colander, etc.

According to an alternative embodiment of the tool of the present invention, said at least one housing comprises a through hole opened through opposed side surfaces of said handle portion. Besides the tools indicated above, such type of housing is preferably realised also on different typologies of tools, such as for example chopping boards.

Preferably, with regard to some typologies of tools (in particular knives, large forks, ladles, etc.), said portion intended to come into contact with the food is made of steel, and said handle portion is made of a thermoplastic material, such as for example polypropylene, polyethylene, ABS, thermoplastic rubber, acetal resin, nylon, also in combination with one another. Preferably, said thermoplastic materials are atoxic, and possibly antibacterial; this allows guaranteeing predetermined hygiene and quality standard into the kitchens. In any case, an alternative embodiment of said typologies of tool can be provided, wherein the portion intended to come into contact with the food and the handle portion are both made of steel, with the handle portion comprising an area made of a thermoplastic material wherein the housing for the distinguishing insert is realised.

On the other hand, in the case of chopping boards, said portion intended to come into contact with the food is preferably made of a synthetic material, so as to limit its wear during the food treatment.

In a second aspect thereof, the present invention relates to a method for personalizing a tool for preparing and treating food depending on the typology of foodstuff for which said tool is intended, characterised in that it comprises the following steps:

providing a tool of the type described above;
providing at least one distinguishing insert;
associating said at least one distinguishing insert with said tool.

The personalization of the tool is thus carried out, in an extremely flexible way, by the user, according to the use he intends to make of the tool, by associating a distinguishing insert (for example, an insert having a particular colour) selected from a plurality of different inserts (for example, a plurality of inserts of different colours) with the tool.

In a third aspect thereof, the present invention relates to a first embodiment of a distinguishing insert for marking a tool of the type described above, characterised in that it comprises a fork element having a shape that is substantially conjugated with that of said groove and intended to be housed in a substantially non-removable way into said groove. Even more preferably, said fork element comprises a pair of wings provided with respective projections overhanging from a free end of each of said wings, said projections being intended to be housed into said opposed recesses formed into said opposed side surfaces of the tool handle portion. Advantageously, the presence of the projections into the fork element and of the recesses into the groove formed into the tool handle portion allows obtaining, in a simple and functional way, a substantially irreversible coupling of the insert with the tool.

Preferably, the fork element is made of an elastically deformable material, for the purpose of allowing an easy housing of the same into the U-groove formed in the tool handle portion.

In a fourth aspect thereof, the present invention relates to a second embodiment of a distinguishing insert for marking a tool of the above described type, characterised in that it comprises a button and a bushing intended to be inserted into said through hole from opposed sides, the button being also intended to be snap-wise housed into the bushing. Preferably, the button comprises a button head and at least one pair of small teeth overhanging from said button head and provided, at a free end thereof, with an external projecting edge, said teeth mutually facing each other so that the external edges define an annular edge having a predetermined diameter, and wherein the bushing comprises a first end portion having a first diameter that is slightly smaller than said predetermined diameter, and a second portion having a diameter that is slightly larger than said predetermined diameter, wherein the substantially annular edge of the button is intended to be housed into the second portion of the bushing after passing through the first end portion of the bushing.

Advantageously, the presence of the annular edge into the button and of the first and second portion with different diameter into the bushing allows obtaining, in a simple and functional way, a substantially irreversible coupling of the button with the bushing, and consequently, of the distinguishing insert with the hole formed into the tool handle portion.

Preferably, in both the embodiments described above, the distinguishing insert is coloured. Advantageously, it is thus possible to distinguish the tools according to a colour code selected by the user, by associating to each colour (and thus, to each tool carrying an insert of that colour) a predetermined typology of foodstuff. Moreover, in the specific case of table knives, the presence of a coloured insert also allows obtaining aesthetic advantages, for example by combining the colour of the insert with that of the table set.

Even more preferably, the insert is marked with a symbol intended to identify a predetermined typology of foodstuff, so as to highlight in a more explicit way the association between tool and foodstuff.

In a fifth aspect thereof, the present invention relates to a kit of parts comprising a tool of the type described above and at least one distinguishing insert of the type described above, for a combined use in the personalization of said tool according to the expected use. Advantageously, said kit of parts allows the user to personalize at his choice the various tools of a predetermined typology of tool, by associating a distinguishing insert to each of them (for example, an insert of a particular colour) selected from a plurality of different inserts (for example, a plurality of inserts of different colours).

In a sixth aspect thereof, the present invention relates to a method for manufacturing the kit of parts described above, characterised in that it comprises the steps of:
- providing at least one tool of the type described above, and
- providing at least one distinguishing insert of the type described above.

In a seventh aspect thereof, the present invention relates to a handle for a tool of the type described above, characterised in that it comprises at least one housing intended to house a distinguishing insert. It is a neutral handle, that is, without any distinguishing mark, but suitable for housing a distinguishing mark, so as to personalize the tool to which said handle is associated. The manufacturing of such handle is easier than that of the knife handle indicated above with reference to the prior art. The manufacturer can advantageously provide for a grand scale production of handles, thus obtaining a considerable reduction of manufacturing costs and times with respect to what was possible with the manufacturing systems of the handles provided with marks.

BRIEF DESCRIPTION OF THE DRAWINGS

Further features and advantages of the present invention will appear more clearly from the following detailed description of some preferred embodiments, made with reference to the attached drawings. In such drawings:

FIG. 1 shows a side view of a first embodiment of a first typology of tool according to the present invention;

FIG. 2 shows a plan top view of the tool of FIG. 1;

FIG. 3 shows a side view of a second embodiment of the typology of tool of FIG. 1;

FIG. 4 shows a plan top view of the embodiment of the tool of FIG. 3;

FIG. 13 shows a front view of the first embodiment of the insert of the present invention, illustrated in FIGS. 1 and from 5 to 8;

FIG. 14 shows a front view of the second embodiment of the insert of the present invention, illustrated in FIGS. 3, and from 9 to 12;

FIG. 15 shows a side view of a second typology of tool according to the present invention;

FIG. 16 shows a plan top view of the tool of FIG. 15;

FIG. 17 shows a side view of a third typology of tool according to the present invention;

FIG. 18 shows a plan top view of the tool of FIG. 17;

Figure 5:
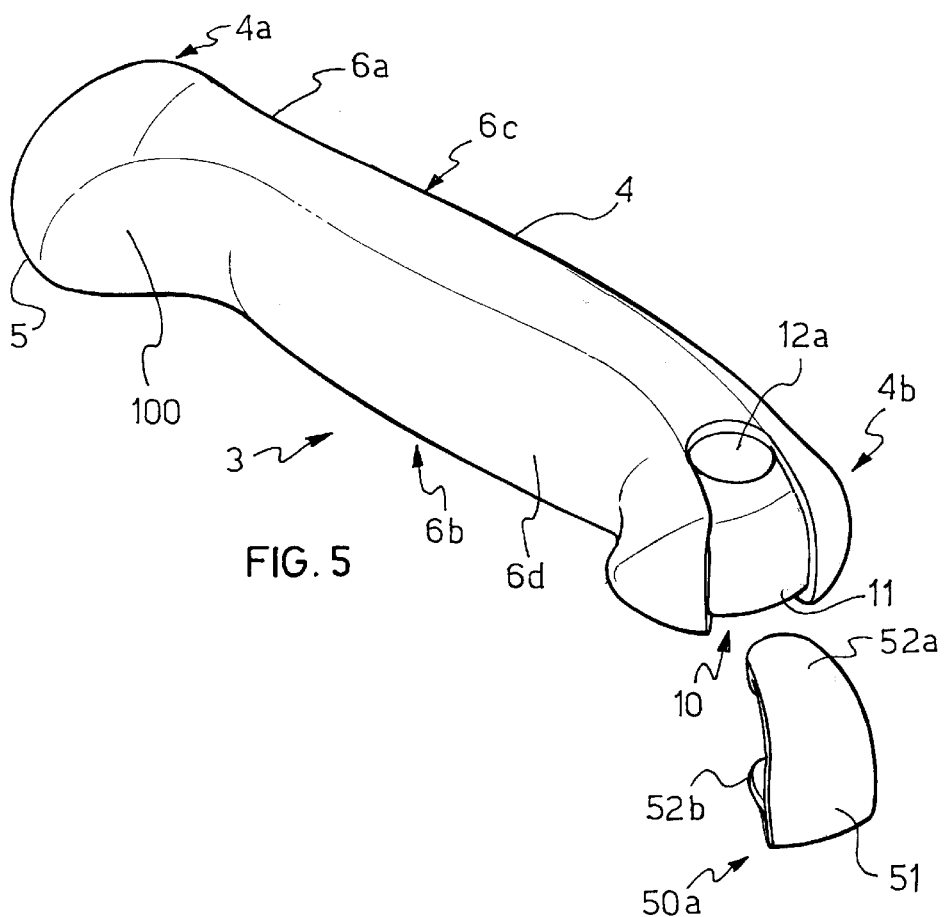
FIG. 5 shows a perspective view of a first embodiment of a handle and of a distinguishing insert for the tool of FIG. 1, in a first work configuration.

In the FIGS. from 1 to 4 and from 15 to 19, reference numeral 1 indicates a tool for preparing and treating food according to the present invention, in various specific embodiments. In particular, the FIGS. from 1 to 4 illustrate a knife, FIGS. 15 and 16 a large fork, FIGS. 17 and 18 a ladle, and FIG. 19 a chopping board. In any case, further embodiments (not shown) of tools used for preparing and treating food fall within the scope of the present invention, such as for example scissors, strainers or colander, etc.

In the following description, equal or similar structural elements in the various embodiments of tool 1 indicated above shall be referred to with the same reference numeral. Regardless of the typology and/or specific embodiment of tool 1 of the present invention, the tool comprises a portion 2 intended to come into contact with the food and a handle portion 3 intended to allow the gripping of tool 1 by the user.

DETAILED DESCRIPTION OF THE PREFERRED EMBODIMENTS

In the following description, reference shall first be made to the tools illustrated in the FIGS. from 1 to 4 (knives) and from 15 to 18 (respectively, large forks and ladles). In particular, for the purpose of making the following description clearer, explicit reference shall be made to knives (FIGS. from 1 to 4) and to handles for knives (FIGS. from 5 to 12), it being understood that what said can be similarly applied to the other types of tools indicated above.

The handle portion (or handle) 3 of tool 1 of the present invention comprises a body 4 having a substantially elongated and ergonomic shape, provided at a first free end 4a with a first slot 5 which is substantially perpendicular to the longitudinal axis of handle 3 and intended to serve as housing for the portion 2 intended to come into contact with food (in the specific case of knives, a blade).

Handle 3 is also provided, at a second free end 4b of body 4 opposed to end 4a, with a housing 10 intended to house a distinguishing insert 50a, 50b.

Figure 6:
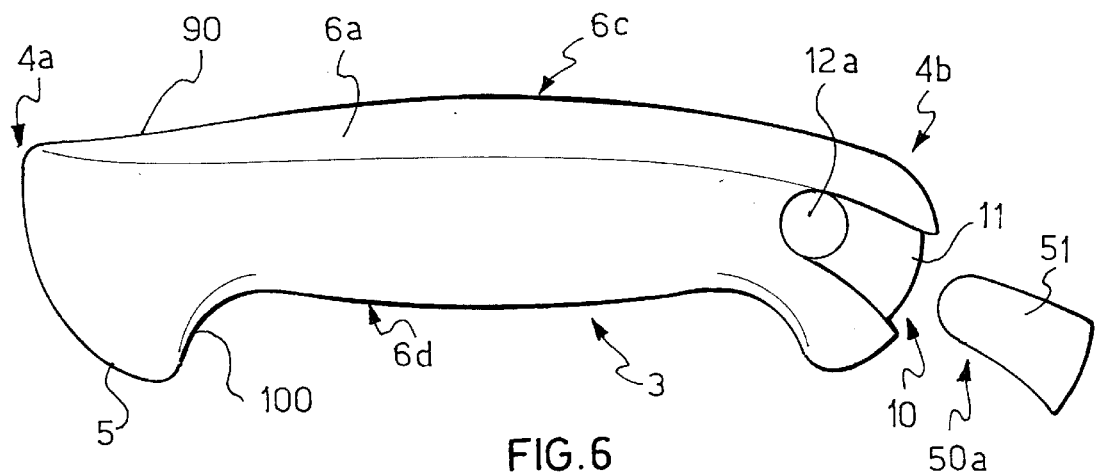
FIG. 6 shows a side view of the handle and of the insert of FIG. 5.
Figure 7:
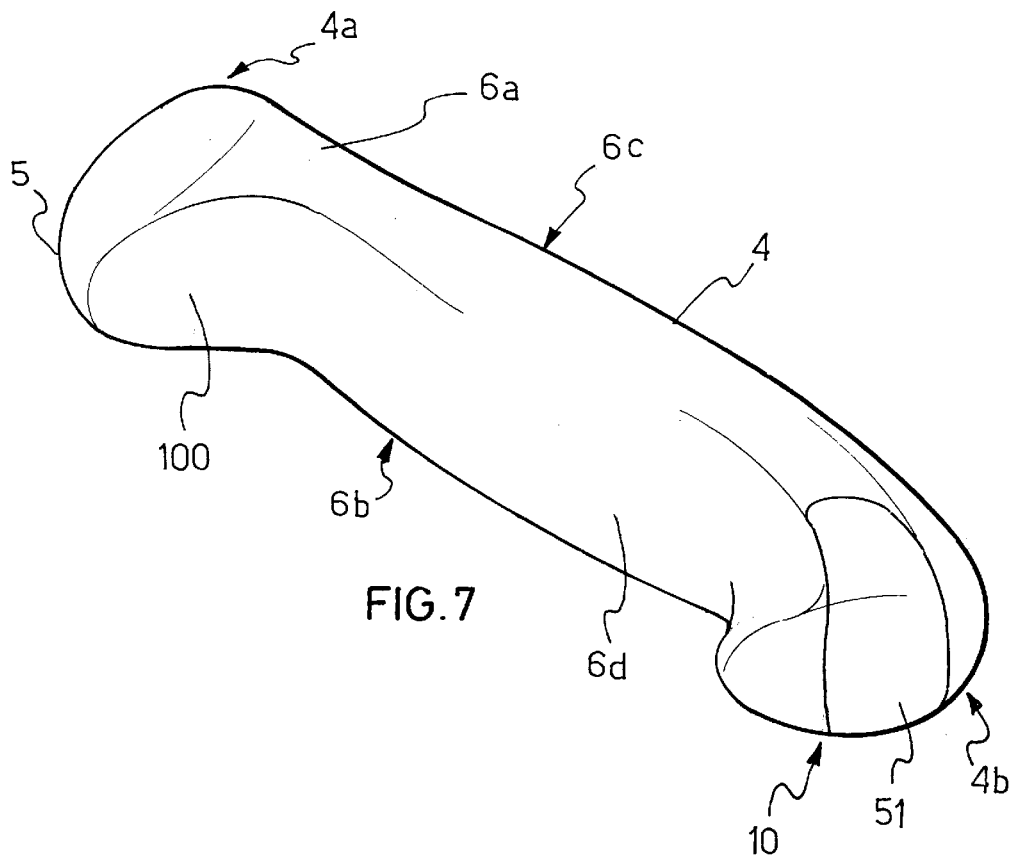
FIG. 7 shows a perspective view of the handle and of the insert of FIG. 5, in a second work configuration.
Figure 8:
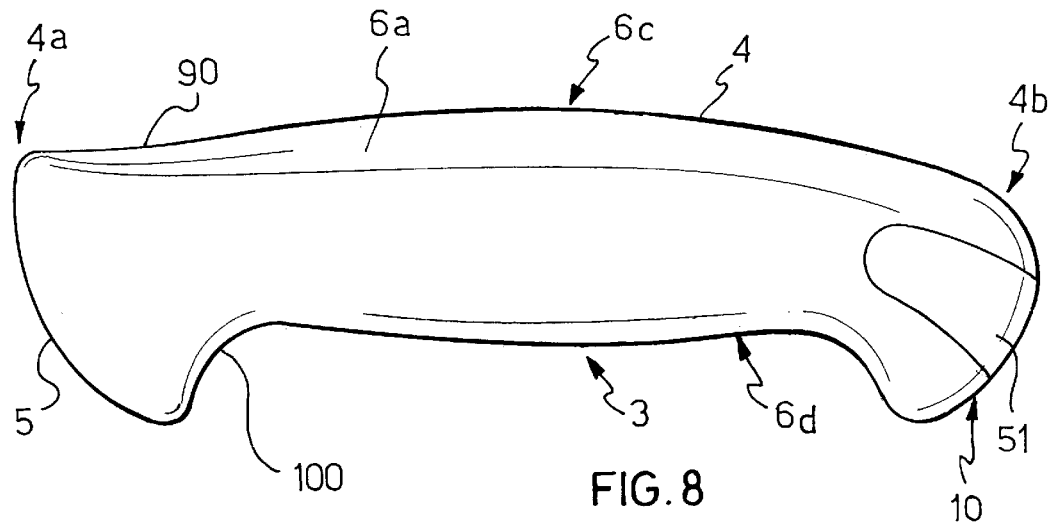
FIG. 8 shows a side view of the handle and of the insert of FIG. 5 in the second work configuration.

According to a first embodiment of tool 1 of the present invention, shown in FIG. 1, housing 10 comprises a substantially U-shaped groove 11 formed onto said second free end 4b of body 4 and partially extended onto opposed side surfaces 6a, 6b of body 4 (reference shall be made, in particular, to FIGS. from 5 to 8). In turn, groove 11 is provided with opposed recesses 12a, 12b (only one of which is visible in FIGS. 5 and 6) formed on the side surfaces 6a, 6b of body 4.

In said embodiment, as shown in detail in FIG. 13, insert 50a consists, in particular, of a fork element 51, having a shape that is substantially conjugated with that of groove 11 and preferably made of an elastically deformable material, such as for example plastic.

The fork element 51 comprises a pair of opposed wings 52a, 52b provided, in the proximity of their respective free ends 53a, 53b, with opposed projections 54a, 54b which are integrally formed with wings 52a, 52b and overhanging from the latter. Projections 54a, 54b are intended to be snap-wise housed into recesses 12a, 12b formed into groove 11 of body 4, so as to realise a substantially irreversible coupling of the fork element 51 with groove 11.

FIGS. from 15 to 18 show the use of insert 50a described above in other typologies of tools (respectively, large forks and ladles).

According to an alternative embodiment of tool 1 of the present invention, shown in FIG. 3, housing 10 comprises a through hole 21 opened through the opposed side surfaces 6a, 6b of body 4 of handle 3 (reference shall be made, in particular, to FIGS. from 9 to 12).

In said embodiment, as shown in detail in FIG. 14, insert 50b consists in particular of a button 60 and a bushing 70, both preferably made of a plastic material. Button 60 and bushing 70 are intended to be inserted into the through hole 21 from opposed sides; button 60 is also intended to be snap-wise housed into bushing in a substantially non-removable way.

The snap-wise and substantially non-removable housing of button 60 into bushing 70 can be obtained through different construction methods; according to one of said methods, shown in FIG. 14, button 60 comprises a substantially circular button head 61 from which overhang at least one pair of equal and reciprocally facing small teeth 62, each one being shaped according to a circular sector having a predetermined diameter and extending by a circumference arc of about 180°. In the preferred embodiment, teeth 62 are four, each one shaped according to a circular sector having predetermined diameter and extending by a circumference arc of about 45°.

Between teeth 62, slits 63 are defined; they are intended to let teeth 62 elastically bend when button 60 is inserted into bushing 70. Teeth 62 exhibit, at a free end 62a thereof, an external projecting edge 64; in practice, at said free end 62a of teeth 62, the totality of edges 64 defines into button 60 an external annular edge having a predetermined diameter. Teeth 62 end with a truncated-conical surface 65.

Bushing 70 comprises a substantially circular flange 71 from which a tubular element 72 overhangs, said element 72 having a first free end portion 73 and an intermediate portion 74. The free end portion 73 has an internal diameter which is slightly smaller than the diameter of the external annular edge of button 60; the intermediate portion 74 has an internal diameter which is slightly larger than the diameter of the external annular edge of button 60. Said edge is intended to be housed into the intermediate portion 74 of bushing 70 after passing through the end portion 73 of the sae bushing.

The tubular element 72 ends with a truncated-conical surface intended to co-operate with the truncated-conical surface 65 of button 60 so as to facilitate the insertion of the latter into bushing 70.

Figure 9:
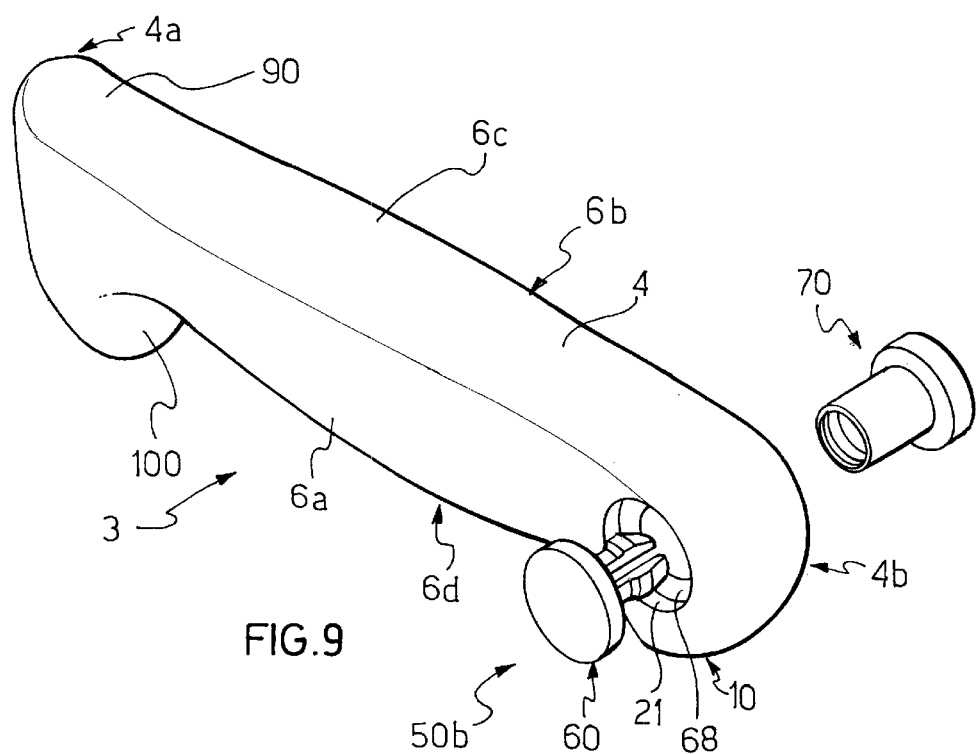
FIG. 9 shows a perspective view of a second embodiment of a handle and of a distinguishing insert for the tool of FIG. 1, in a first work configuration.
Figure 10:
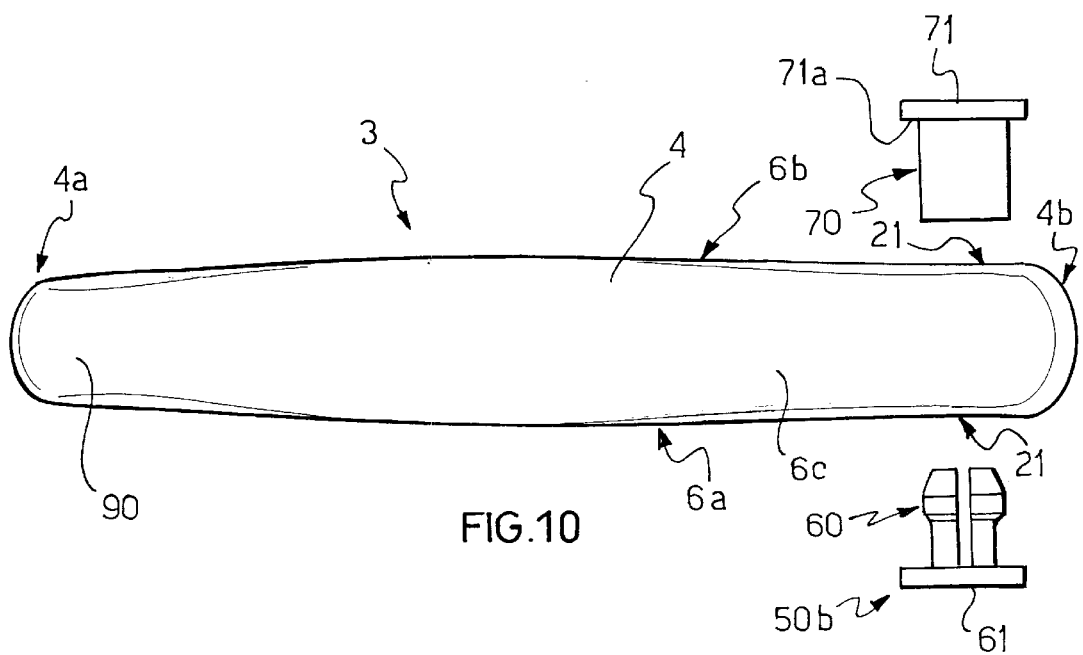
FIG. 10 shows a plan top view of the handle and of the insert of FIG. 9.
Figure 11:
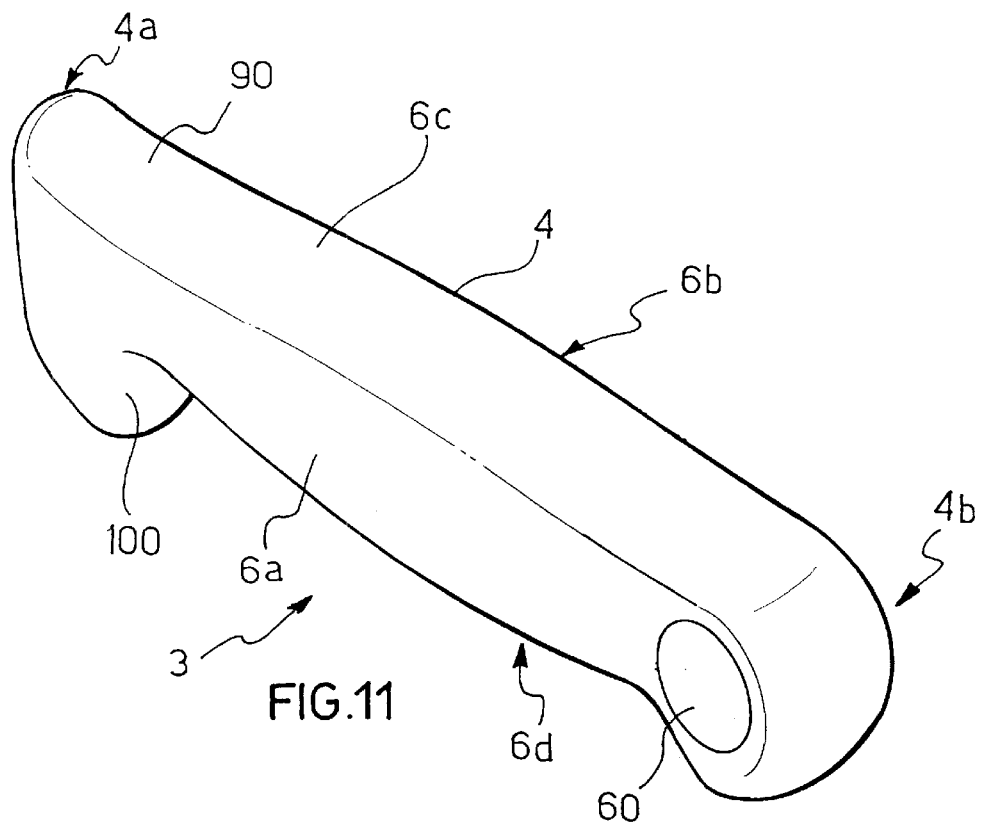
FIG. 11 shows a perspective view of the handle and of the insert of FIG. 9, in a second work configuration.
Figure 12:
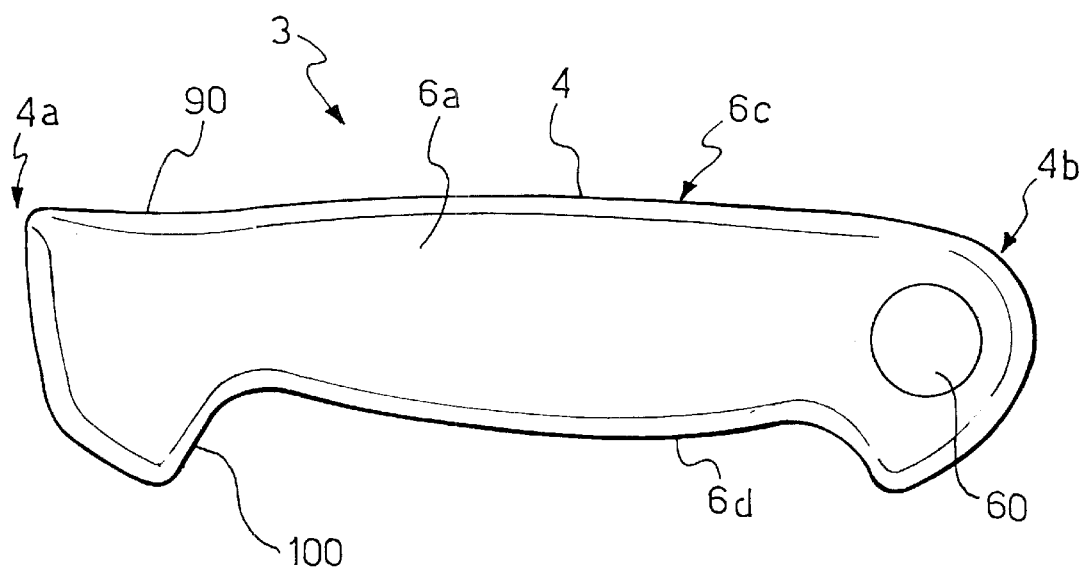
FIG. 12 shows a side view of the handle and of the insert of FIG. 9, in the second work configuration.

Head 61 of button 60 and flange 71 of bushing 70 further comprise annular surfaces 61a and 71a intended to cooperate with respective abutment surfaces 68 formed, at the through hole 21, onto the opposed side surfaces 6a, 6b of handle 4 of tool 1 (reference shall be made to FIGS. 9, 13 and 14).

Figure 19:
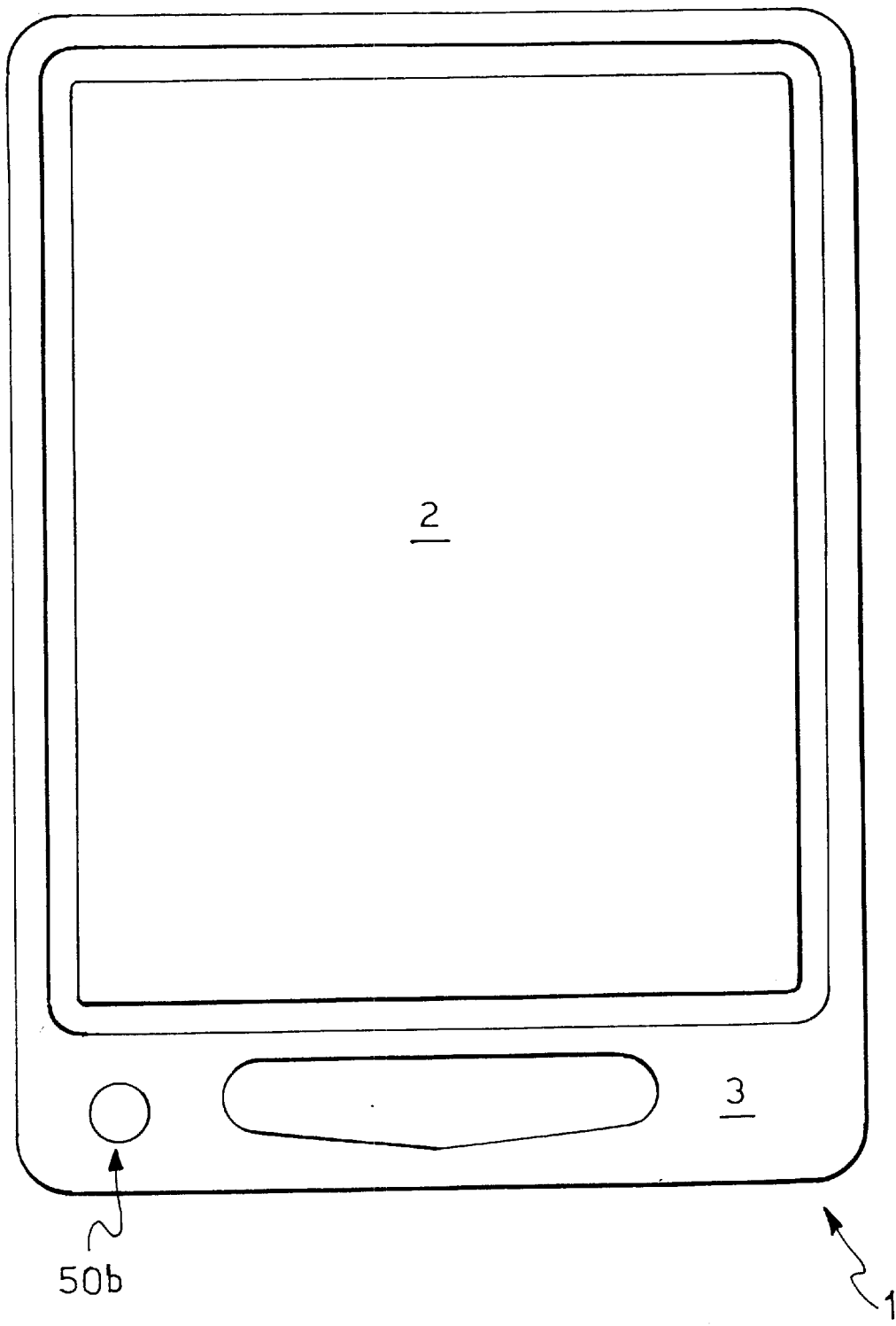
FIG. 19 shows a side view of a fourth typology of tool according to the present invention.

FIG. 19 shows the use of insert 50b described above in another typology of tool, in the specific case, a chopping board. Of course, an insert of the type described above can also be applied to other typologies of tools, such as for example those shown in the FIGS. from 15 to 18 (respectively, large forks and ladles) in place of the fork-shaped insert 50a.

Preferably, in both embodiments of the distinguishing insert 50a, 50b described above, the insert is coloured, so as to allow a user to distinguish the tools depending on a colour code selected by the same user. Moreover, insert 50a, 50b can be marked with a symbol intended to identify a predetermined typology of foodstuff for which the tool in which insert 50a, 50b is intended to be fixed must be used.

In the preferred embodiments of the tool of the present invention, insert 50a, 50b, once applied to the tool, is slightly recessed into the same tool; this allows compensating possible dimensional errors in the moulding of the tool handles, preventing the insert from protruding from the handle, in which case its removal would be facilitated.

In the specific case of knives, large forks, ladles and similar tools, advantageously, body 4 of handle 3 of tool 1 is preferably made of a thermoplastic material, such as for example polypropylene, polyethylene, ABS, thermoplastic rubber, acetal resin, nylon, also combined with each other. In a preferred embodiment of the tool of the present invention, said thermoplastic material is also atoxic, and possibly antibacterial, for the purpose of guaranteeing predetermined hygiene and quality standards into the kitchens.

In any case, an alternative embodiment of said typologies of tool is possible, wherein the portion 2 intended to come into contact with the food and the handle portion 3 are both made of steel, with the handle portion 3 comprising an area made of a thermoplastic material wherein a housing 21 is realised for housing the distinguishing insert 50a, 50b.

On the other hand, in the case of chopping boards, portion 2 intended to come into contact with the food is preferably made of a synthetic material, so as to obtain less wear during the food treatment.

In the specific case of knives, handle 3 of the tool of the invention also comprises, at a first free end 6a, a depression 90 formed on an upper surface 6c of body 4; said depression 90 is intended to serve as finger-rest for the thumb of the user's hand gripping the knife, during the foodstuff cutting operations. Moreover, handle 3 comprises, at the first free end 6a, a projection 100 formed on a lower surface 6d of body 4; said projection 100 is intended to serve as protection for the fingers of the user's hand gripping the knife, during the foodstuff cutting operations.

The tool of the present invention and the distinguishing insert 50a, 50b are intended to form a kit of parts for manufacturing a personalizable tool, as shown in FIGS. from 1 to 4 and from 15 to 19.

The manufacturer provides the tool 1 and a plurality of distinguishing inserts 50 having different colour. The personalization is carried out afterwards directly by the user who associates a distinguishing insert 50a, 50b, having a particular colour, with each tool, depending on the typology of foodstuff for which that tool is intended to be used.

What is claimed is:

1. Tool for preparing and treating food comprising a portion intended to come into contact with the food and a handle portion including a gripping portion intended to allow the gripping of said tool by a user and at least one housing intended to house a distinguishing insert for marking the tool, wherein said at least one housing is provided close to a free, end of the handle portion and external to said gripping portion and comprises a substantially unshaped groove extending at least partly into opposed sides surfaces of said handle portion, and a distinguishing insert for marking the tool disposed in said groove wherein the insert comprises a fork element having a shape that is substantially conjugated with that of said groove and intended to be housed in a substantially non-removable way into said groove.

2. Tool according to claim 1, wherein said portion intended to come into contact with the food is made of steel and said handle portion is made of a thermoplastic material.

3. Tool according to claim 1, wherein said portion intended to come into contact with the food and said handle portion are both made of steel.

4. Tool according to claim 1, wherein said portion intended to come into contact with the food is made of a synthetic material.

5. Tool according to claim 1, wherein said thermoplastic material is an atoxic material.

6. Tool according to claim 1, wherein said thermoplastic material is an antibacterial material.

7. A tool according to claim 1, wherein said fork element is made of an elastically deformable material.

8. A tool according to claim 1, wherein the fork element comprises a pair of wings provided with respective projections overhanging from a free end of each of said wings, said projections being intended to be housed into said opposed recesses formed into said opposed side surfaces of the tool handle portion.

9. A tool according to claim 1, characterized in that the insert is colored.

10. A tool according to claim 1, characterized in that the insert is marked with a symbol intended to identify a predetermined type of foodstuff.

11. Handle for a tool comprising a gripping portion intended to allow the gripping of the handle by a user, a recessed housing having a configuration for receiving a distinguishing insert wherein said housing comprises a substantially unshaped groove extending at least partly into opposed side surfaces of said handle portion and wherein said housing is provided close to a free end of the handle and external to said gripping portion and a distinguishing insert comprising a fork element having a shape that is substantially conjugated with that of said groove and intended to be housed in a substantially non-removable way into said groove.

12. Handle according to claim 11, wherein said handle is made of steel and wherein said fork element is made of a elastically deformable material.

13. Handle according to claim 11, wherein the fork element comprises a pair of wings with respective projections overhanging from a free end of each of said wings, said projections being intended to be housed into said opposed recesses formed into said opposed side surfaces of the handle.

14. Handle according to claim 11, wherein the insert is colored.

* * * * *

UNITED STATES PATENT AND TRADEMARK OFFICE
CERTIFICATE OF CORRECTION

PATENT NO.    : 6,560,877 B2
DATED         : May 13, 2003
INVENTOR(S)   : Gian Battista It is certified that error appears in the above-identified patent and that said Letters Patent is hereby corrected as shown below:

<u>Title page,</u>
Item [73], Assignee's, address, delete "Prenama" insert -- Premana --

Signed and Sealed this

Sixteenth Day of December, 2003

JAMES E. ROGAN
*Director of the United States Patent and Trademark Office*